Nov. 12, 1968   J. C. LOCKWOOD   3,410,322
FILL VALVE ASSEMBLY
Filed April 18, 1966                                   2 Sheets-Sheet 1
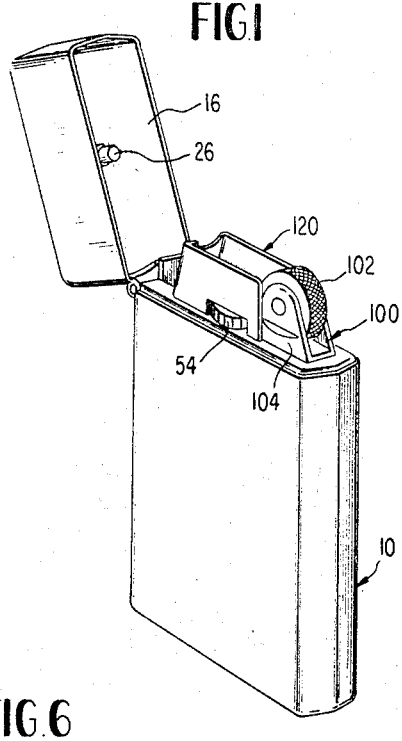
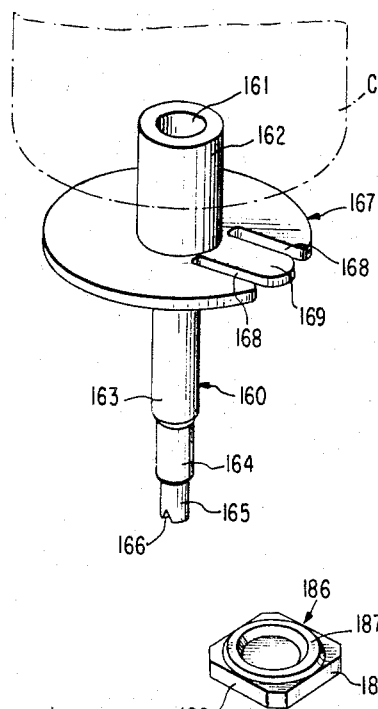
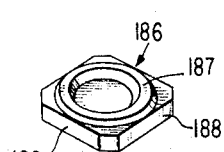
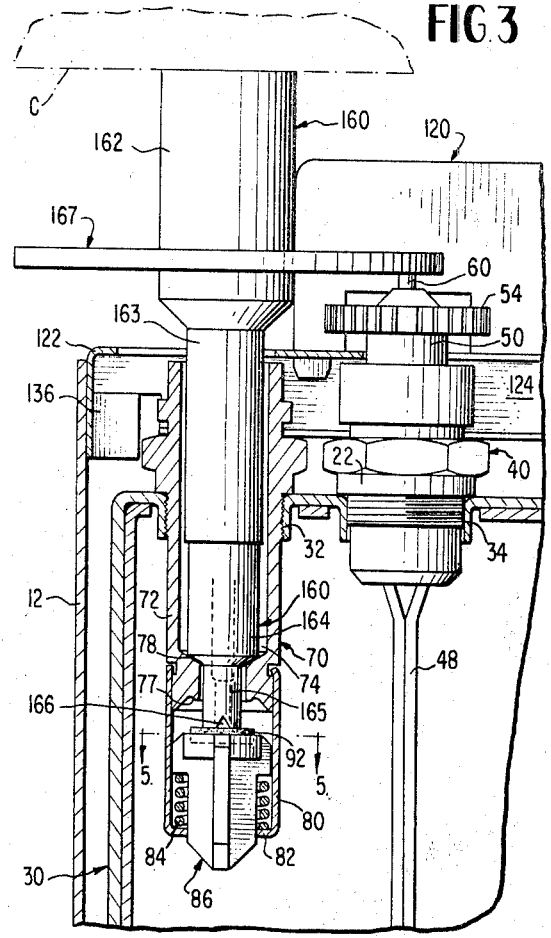
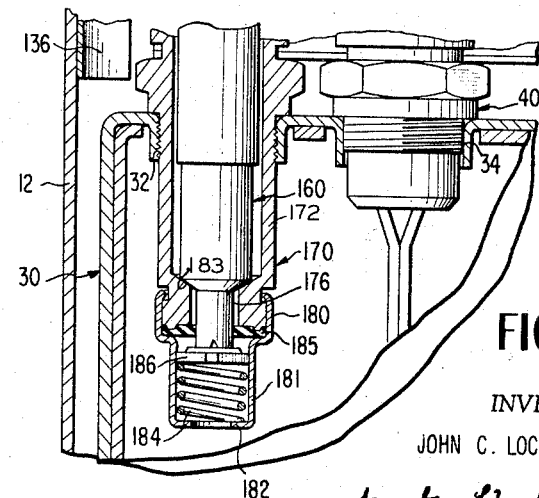
INVENTOR
JOHN C. LOCKWOOD
BY  *Newton, Hopkins,
Jones & Ormsby*
ATTORNEY Nov. 12, 1968
J. C. LOCKWOOD
3,410,322
FILL VALVE ASSEMBLY
Filed April 18, 1966
2 Sheets-Sheet 2
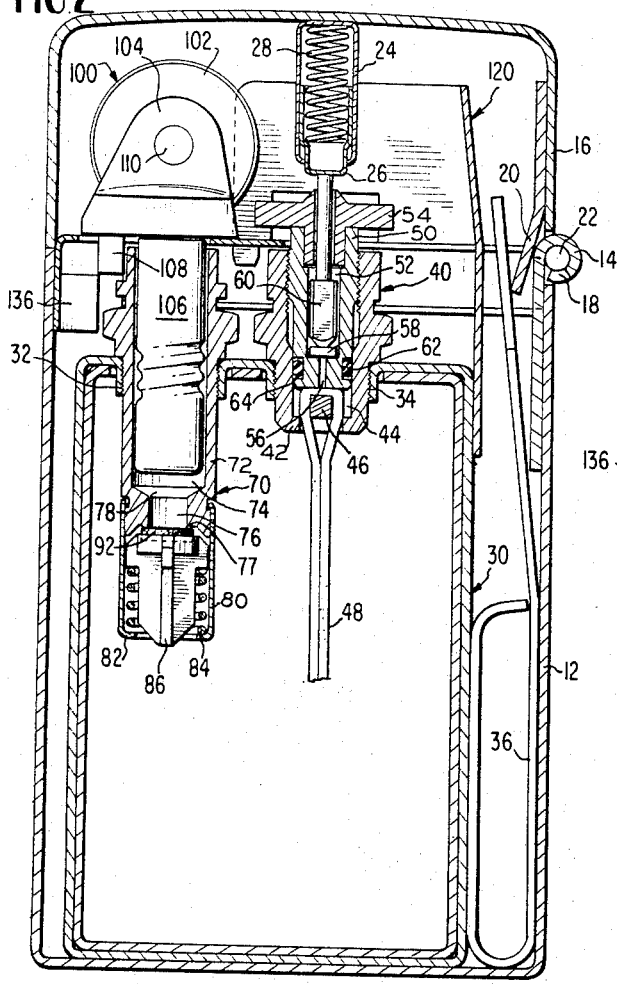
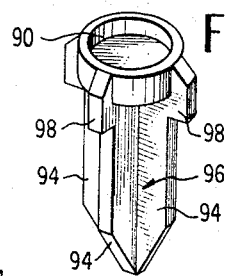
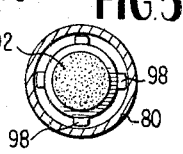
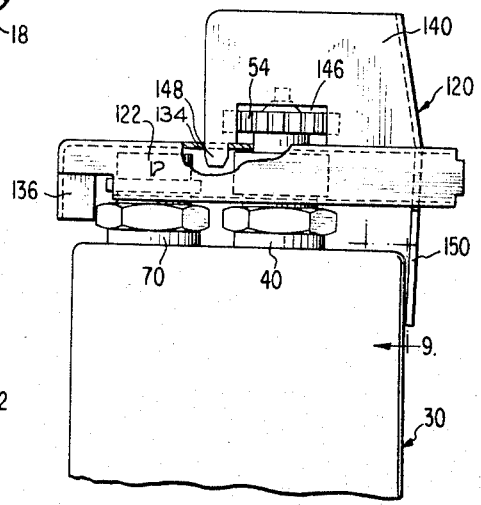
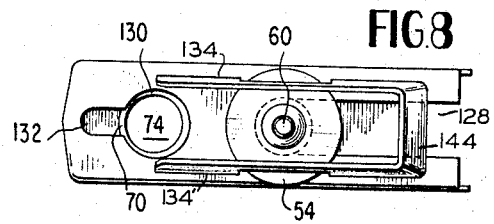
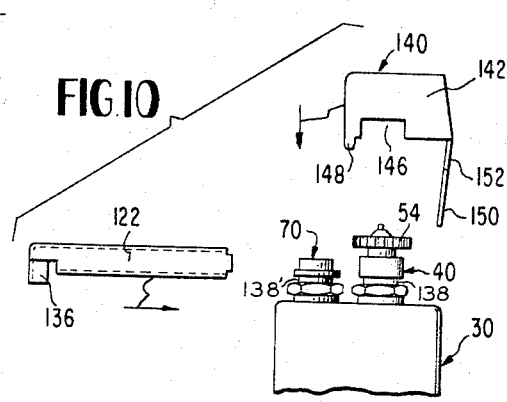
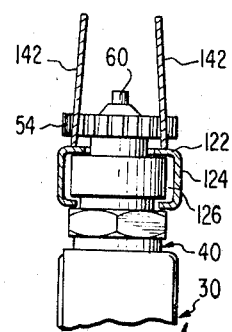
INVENTOR
JOHN C. LOCKWOOD
BY Newton, Hopkins,
Jones & Ormsby
ATTORNEY

United States Patent Office 3,410,322
Patented Nov. 12, 1968

3,410,322
FILL VALVE ASSEMBLY
John C. Lockwood, Atlanta, Ga., assignor to Scripto, Inc., a corporation of Georgia
Filed Apr. 18, 1966, Ser. No. 543,167
1 Claim. (Cl. 141—302)

ABSTRACT OF THE DISCLOSURE

The present invention relates to a fill valve assembly for a gas fueled lighter wherein the valve body is reciprocally mounted within the assembly and carries a sealing member on its upper portion and has a plurality of peripheral channel portions formed thereabout, at least one of which is utilized for the introduction of fuel into the reservoir when the valve is in its open position and the other non-filling channel being utilized to vent to the atmosphere any vaporized gas that is present in the reservoir.

---

These and other features and advantages of the present invention will become more clearly understood upon consideration of the following specification and the accompanying drawings wherein like characters of reference designate corresponding parts throughout and in which:

FIG. 1 is a perspective view of the gas fueled lighter of the present invention with its cover cap in the open position;

FIG. 2 is a side elevational view with certain parts appearing in cross section;

FIG. 3 is a partial side elevational view showing some of the parts in cross section and with a fill nozzle inserted into the fill valve to effect the filling of the gas fuel reservoir;

FIG. 4 is a perspective view of the valve body utilized in the fill valve of the present invention;

FIG. 5 is a cross sectional view taken along lines 5—5 in FIG. 3;

FIG. 6 is a perspective view of the fill nozzle of the present invention utilized to effect filling of the gas fuel reservoir;

FIG. 7 is a partial side elevational view showing the windguard assembly;

FIG. 8 is a top plan view of the windguard assembly shown in FIG. 7;

FIG. 9 is a cross sectional view taken along lines 9—9 in FIG. 7;

FIG. 10 is an exploded view of the windguard assembly showing the components of the windguard assembly prior to its final positioning on the fill valve assembly, burner valve assembly and gas fuel reservoir;

FIG. 11 is a partial cross-sectional view of the gas fueled lighter of FIG. 1 utilizing a second embodiment of the fill valve assembly with a fill nozzle inserted in the fill valve assembly to effect the filling of the gas reservoir; and, FIG. 12 is a perspective view of the valve body utilized in the fill valve assembly in FIG. 11.

These figures and the following detailed description disclose a specific embodiment of the invention; however, the inventive concept disclosed herein is not limited thereto since the invention may be embodied in other equivalent forms.

Specifically referring now in detail to the embodiment chosen for the purposes of illustration, the gas lighter hereinafter described is generally denoted by the numeral 10. Referring to FIG. 2, it will be seen that outer casing 12 is provided with hinge pin holder 14 for hingeably connecting thereto the cover cap 16 which likewise is provided with a cooperating hinge pin holder 18 and having an inwardly disposed tang member 20 which is utilized to hold the cover cap in its closed and opened positions. A pin 22 extends through the hinge pin holders 14 and 18 thereby mounting the cover cap 16 on the outer casing 12 in pivotal relation about said pin 22. The cover cap 16 is further provided with a sleeve 24 on the inside thereof that slidably houses therein valve closure button 26 that is outwardly biased by a spring member 28 to effectively close a burner valve assembly 40 carried in the casing 12 when the cap 16 is in closed position.

Within the outer casing 12 is positioned the gas fuel reservoir 30 that is adapted to receive therein liquified gas under pressure. The upper portion of the gas fuel reservoir 30 is provided with a fill valve assembly aperture 32 and a burner valve assembly aperture 34 to threadably receive therein the respective assemblies. It should be noted that at the right side of FIG. 2 there is a spacing between the outer surface of the gas fuel reservoir 30 and the inner wall of the outer casing 12. Within this space is disposed outwardly biased cap spring 36 which cooperates with tang 20 for holding the cover cap 16 in its closed or opened positions.

The burner valve assembly 40 is threadably mounted in burner valve assembly aperture 34 and appropriately sealed to prevent the escape of gas from the fuel reservoir 30. The burner valve assembly 40 includes a burner housing 42 that has a central aperture 44 extending therethrough, the lower portion of said central aperture opening into the gas fuel reservoir 30 wherein an anvil 46 of substantially square cross-section area is mounted to support thereon a wick 48 that lies over the upper surface of said anvil and having its terminal extremities extending into the fuel gas reservoir 30 through the central aperture 44.

A burner stem 50 is threadably mounted for rotation and reciprocal movement within the burner housing 42 and has formed therethrough central passage 52 which communicates with the wick 48. The upper portion of the burner stem is fitted with a flame adjustment wheel 54 which is rotated to selectively regulate the positioning of the burner stem 50 with respect to anvil 46. Since the lower portion of the burner stem 50 is adjacent the wick, varying the position of the stem 50 with respect to the anvil 46 subjects the wick 48 to varying degrees of compression thereby regulating the flow of gas through the central passage 52 and the flame height as the gas emitted from the outer extremity of the central passage 52 is burned. Immediately above the wick 48 is the gas escape orifice 56 connecting the wick 48 with the passage 52 above which is positioned a rubber gas escape seal 58 selectively held in the closed position by a reciprocal pin 60. The pin 60 is urged downwardly by the biased closure valve button 26 as seen in FIG. 2 when the cap 16 is in the closed position to prevent the escape of gas from the gas reservoir 30 and is urged upwardly by the gas pressure within the gas reservoir 30 when the cap 16 is in the open position to allow the escape of gas from the reservoir 30. The wick 48 disclosed herein is a high temperature resistant nylon type paper such as that commercially produced under the trademark Nomex by E. I. du Pont of Wilmington, Del. The thickness of the nylon paper is $\frac{1}{32}$ inch prior to compression and $\frac{1}{100}$ inch during operational compression. The area of the paper held between the burner stem 50 and the upper surface of anvil 46 is .100 inch x .060 inch. The orifice 56 is 0.022 inch in diameter and 0.122 inch long. A gas tight seal is maintained between the burner stem 50 and the central passage 44 of the burner housing 42 by means of O ring sealing means 62 that is positioned within annular groove 64 formed about the lower periphery of the burner stem 50.

A fill valve assembly 70 which includes a valve housing 72 is threadably fitted into the fill valve aperture 32 and sealed therein to prevent escape of gas from the gas reservoir 30. The upper portion of the valve housing 72 is formed with a spark wheel assembly receiving chamber 74 which in turn communicates with fill port 76 of reduced diameter, the juncture of which forms an upwardly facing annular shoulder 78. The under side of the housing 72 is appropriately formed into an annular valve seat 77.

About the lower extremity of the valve housing 72 is fitted a valve sleeve 80 which extends below the valve housing 72 and has an inwardly turned spring retaining lip 82 at the lower end thereof on which spring 84 is seated. Carried within the coils of spring 84 is fitted valve body 86, the structural details of which can be readily seen in FIG. 4. The upper portion of the valve body 86 has an annular recess 90 adapted to receive therein the fill port seal 92 and the lower portion of the valve body 86 is formed with longitudinally extending vanes 94 which are positioned from one another by 90° so as to form four peripheral quadrants 96. The upper portion of each of the vanes has an outwardly projecting lug 98 which abuts the inner wall of the valve sleeve 80 and centrally locates the valve body 86 for reciprocal movement within the sleeve 80. The spring 84 urges the body 86 upwardly to close the fill port 76 by seating the seal 92 against the valve seat 77.

Referring to FIG. 11, it will be seen that the second embodiment of the fill valve assembly indicated at 170 utilizes the valve housing 172 threadably fitted into the fill valve aperture 32. About the lower extremity of the valve housing 172 is fitted a valve sleeve 180 which extends below the valve housing 172 and has a sleeve portion 181 of reduced diameter which has an inwardly turned spring retaining lip 182 at the lower end thereof. A shoulder 183 is formed between the upper portion of the sleeve 180 engaging the housing 172 and the reduced sleeve portion 181 and carries thereon a rubber sealing washer 185 effective to engage a fill nozzle 160 when inserted through the fill port 176 in the housing 172 to preclude the escape of gas from the reservoir 30 through the chamber 174 during the filling operation.

Seated on the spring retaining lip 182 is a spring 184 which carries at the upper end thereof a fitted valve body 186, the structural details of which can be readily seen in FIG. 12. The valve body 186 is a generally circular plate member which has an annular ridge 187 integral with the upper surface thereof. The valve body 186 has a plurality of spaced segments 188 removed therefrom to effect the inward flow of liquified gas during filling. The spring 184 is effective to urge the body 186 upwardly against the lower surface of the washer 185 so that the ridge 187 engages the rubber washer 185 and precludes the escape of gas from the reservoir 30 when the fill nozzle 160 is removed from the fill valve assembly 170.

Within the spark-wheel receiving chamber 74 is received the spark-wheel assembly 100 which uniquely serves as a cover for the fill valve assembly 70 or 170. The spark-wheel assembly 100 includes a spark-wheel 102 and yoke portion 104 that is adapted to receive the flint, spring, and follower button (not shown) that are disposed within a cover sleeve 106 carried by the yoke portion 104, the details of which are fully disclosed in U.S. Patent No. 2,986,026. The spark-wheel assembly 100 further has a positioning lug 108 depending from the bottom of the yoke portion 104 and an axle 110 for supporting the spark-wheel 102 for rotary movement thereon.

Positioned about the upper extremity of the burner valve 40 is a windguard assembly 120 that includes a base plate 122 with depending, opposed side walls 124 having their lower extremities turned inwardly to form a channel 126. The base plate 122 is further formed with a burner slot 128 which extends approximately half way along its length and with a spark-wheel aperture 130 intermediately located between the slot 128 and the opposite end of the base plate 122 and which communicates with an alignment slot 132 which receives the positioning lug 108 therein to properly orient the spark-wheel assembly 100. Disposed outwardly of and between the slot 128 and the aperture 130 are shield positioning apertures 134 and 134'. The end of the base plate that is opposite from the end in which burner slot 128 is formed is provided with a depending spare flint sleeve 136. The outwardly extending portions of both the burner valve assembly 40 and the fill valve assemblies 70 or 170 are formed with peripheral annular recesses 138 and 138' for receiving therein the inwardly turned ends of side walls 124 to retain the windguard assembly onto the burner valve assembly 40 and the fill valve assemblies 70 or 170.

It will be seen in FIGS. 7, 8, 9 and 10 that the channel section 126 is fitted onto the burner assembly 40 to maintain proper alignment of the base plate 122 with respect to the gas fuel reservoir 30, the burner valve assembly 40, and the fill valve assembly 70 or 170. The windguard 140 is formed to include two opposed shield portions 142 and an end wall section 144, the shield portions being formed with notches 146 that are adapted to fit about the flame height adjustment wheel 54. The windguard 140 is attached to the base plate 122 by virtue of depending positioning lugs 148 on the bottom of the shield portions 142 being fitted into the shield positioning apertures 134 and 134' and held in position by virtue of a tensioning arm 150 integral with the end wall section 144 when disposed within burner slot 128. The arm 150 is held in position by virtue of notches 152 formed in each side of the tensioning arm 150. It should be noted that the lower end of the tensioning arm 150 abuts the side of the gas fuel reservoir 30, thereby producing a moment of force on the windguard assembly 120 that causes the positioning lugs 148 to be urged downwardly into the positioning aperture 134 and 134' of the base plate 122.

The fill valve nozzle 160 utilized to fill reservoir 30 through the valve assembly 70 and 170 of the present lighter as shown in FIGS. 3, 6 and 11 is fitted onto a refill can C which is shown in dotted lines. The fill nozzle 160 includes a central axial passage 161 and has an upper connector portion 162 which is joined with intermediate sections 163 and 164 progressively reduced in diameter. Intermediate section 164 is further reduced to form terminal section 165 provided with a transverse gas emitting notch 166 that communicates with the axial passage 161. About the upper connector portion 161 is formed a spray guard 167 having formed therein windguard slots 168 that are adapted to receive therebetween shield portions 142 as shown in FIG. 3. Between windguard slots 168 is formed a pin engaging arm 169 which is adapted to keep the reciprocal pin 60 depressed and thus maintain the burner valve in a closed position during the filling operation.

To operate the lighter, the cover cap 16 is manually opened thus allowing the reciprocal pin 60 to be unseated by virtue of the gas pressure within the gas fuel reservoir 30 and allowing the gas to escape and mix with the atmosphere for ignition upon the manual rotation of the spark-wheel 102.

To fill the gas fuel reservoir 30 the spark-wheel assembly 100 is removed from fill valve housing 72 to uncover the chamber 74. The fill nozzle 160 is disposed within the spark-wheel receiving chamber 74 until the terminal sleeve section 165 enters fill port 76 and abuts the fill port seal 92 of valve body 86 moving it away from its sealed position to the open position shown in FIG. 3 where the shoulder 78 of fill valve housing 72 abuts the intermediate section 164 of fill nozzle 160.

Using the fill valve assembly 70, it will be seen that the valve body 86 is divided into four peripheral quadrants 96, thereby providing for entry of liquid gas from the gas emitting notch 166 to be directed into one or two of the quadrants and to enter the reservoir 30 through the bottom of valve sleeve 80. At the same time, the valve body 86 provides for venting trapped gas within the reservoir 30 to the atmosphere by use of the quadrants that are free of the entering liquified gas and through the clearance that exists between the fill nozzle 160 and the passages of the fill valve assembly 70.

Using the fill valve assembly 170, it will be seen that the valve body 186 is forced away from its sealed position so that gas from the fill can C can be introduced into the reservoir 30 through the notch 166. The washer 185 engages the side wall of the terminal section 165 and prevents intentional venting of the gas from within the reservoir 30.

The present invention has been described in detail above for the purposes of illustration only and is not intended to be limited by this description or otherwise except as defined in the appended claim.

What is claimed as invention is:

1. A fill valve assembly for a gas fueled lighter having a reservoir therein including a valve housing with a central aperture; an open ended sleeve carried on said housing and communicating with said reservoir and said central passage; a valve body reciprocally mounted within said assembly and a sealing member positioned on the upper portion of said valve body; said valve body being resiliently urged toward the bottom of said housing to seal said central aperture; said valve body having a plurality of peripheral channel portions formed thereabout, at least one of which is utilized for the introduction of fuel into said reservoir when said valve body is moved away from its said sealed position and the other non-filling channel portion being utilized to vent to the atmosphere any vaporized gas that is present in said reservoir.

References Cited

UNITED STATES PATENTS

| 2,546,475 | 3/1951 | Rizzo et all. | 67—7.1 |
| 3,211,194 | 10/1965 | Projahn | 141—302 X |
| 3,217,762 | 11/1965 | Burchett | 141—293 X |

HOUSTON S. BELL, JR., *Primary Examiner.*